United States Patent
Fishman

[11] 3,908,270
[45] Sept. 30, 1975

[54] ENDODONTIC APICAL SEALER METHOD AND APPARATUS

[76] Inventor: Mark J. Fishman, 877 E. 54th St., Brooklyn, N.Y. 11234

[22] Filed: June 29, 1973

[21] Appl. No.: 374,824

[52] U.S. Cl. .................................................. 32/15
[51] Int. Cl.² .......................................... A61K 5/02
[58] Field of Search ............. 215/47, 48, 49; 32/57, 32/15, 13, 40 R

[56] References Cited
UNITED STATES PATENTS

| | | | |
|---|---|---|---|
| 1,757,595 | 5/1930 | Siegel | 32/15 |
| 2,153,807 | 4/1939 | Kleinert | 215/48 |
| 3,035,351 | 5/1962 | Hirsch | 32/40 R |
| 3,318,000 | 5/1967 | Paris | 32/15 |
| 3,321,098 | 5/1967 | Ogle | 215/47 X |

Primary Examiner—Robert Peshock
Attorney, Agent, or Firm—Joseph E. Rusz; Sherman H. Goldman

[57] ABSTRACT

A method and apparatus for sealing the apex of an endodontically treated tooth wherein the apex of the canal is sealed with a tapered screw or plug element which engages the wall of the canal to allow for subsequent syringe filling of the canal without overfilling beyond the tooth structure.

9 Claims, 6 Drawing Figures

ENDODONTIC APICAL SEALER METHOD AND APPARATUS

BACKGROUND OF THE INVENTION

This invention relates generally to a technique and apparatus for endodontically treating teeth and more particularly to the utilization of a tapered self-sealing apical screw or a plug for sealing the end of the root canal prior to its syringe filling.

Previously, root canal or endodontic treatment of teeth involved the instrumentation of the root canal by tapered files or reamers of gradually increasing size until the walls of the canal were properly cleaned and prepared. Then gutta percha or a notched silver point of the proper size was inserted and sealed or cemented to the canal. Because lateral canals ofttimes become a focal point of bacterial growth syringing of a filler into the main canal has become a recognized procedure for eliminating voids and filling both the main canal and lateral canals, when present. The syringing technique, however, had as a deficiency, the problem of overfilling, i.e., the presenting of the sealing material beyond the apex of the canal in contact with periapical tissue due to the inconsistency in obtaining a good seal with the use of points. With a long point, it is extremely difficult to ascertain which portion of the length of the point binds against the canal walls. Furthermore, since the point has a relatively long length in the canal, the restoration process and subsequent drilling into the canal area are impeded by the presence of that portion remote from the canal apex.

SUMMARY OF THE INVENTION

This invention comprises a self-sealing apical element or screw for teeth being endodontically treated. The element is placed in position and sealed to the root canal at its apex after filing or reaming, and the remainder of the canal is then filled by syringe with a sealing filler.

Accordingly, it is an object of this invention to provide a method and apparatus for endodontically treating teeth which eliminates the need to select and fit points or other filler material.

It is another object of this invention to provide endodontic apparatus and a technique which prevents overfilling of a root canal beyond the extremities thereof.

It is still another object of this invention to provide a method and apparatus for endodontically treating teeth whereby filler can be syringed into lateral canals extending from the main root canal.

It is a still further object of this invention to provide a method and apparatus for endodontically treating teeth which allows for a secure seal at the apex thereof.

Another object of this invention is the provision of a double seal of an endodontically treated tooth.

Still another object of this invention is to provide a method and apparatus for endodontically treating teeth which enables the syringing of filler into a root canal while confining the filler to a predetermined apical position.

A further object of this invention involves the utilization of a technique and apparatus for endodontic tooth treatment which greatly reduces the procedure or chair time required.

A still further object of this invention is to provide an apical sealer element which is related in size to the largest file or reamer size used to prepare a root canal.

Another object of this invention is to provide a short sealing element for the apex of a root canal that doesn't extend an appreciable distance along the canal.

Still another object of this invention involves the provision of apical sealing elements which may be easily and economically manufactured of conventional, currently available materials that lend themselves to standard mass production manufacturing techniques.

DESCRIPTION OF THE PREFERRED EMBODIMENTS

Figure 1:
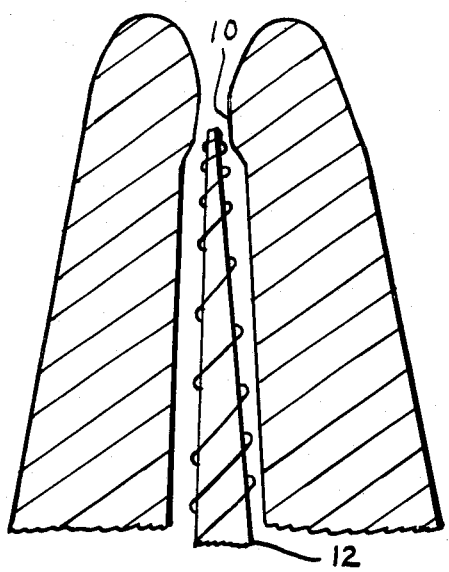
FIG. 1 is a view in cross section of a portion of a tooth being endodontically treated by instrumenting the canal.

The endodontic treatment of a tooth usually requires debridement, i.e., drilling to the nerve and removing it. At this point measurement control may be effected by x-raying the tooth with a file in place. Instrumentation for shaping and cleaning the canal comprises the next step and is usually performed with tapered files or reamers of gradually increasing size until the walls of the canal are properly cleaned and prepared. FIG. 1 illustrates a canal wherein the wall 10 has been instrumented and has the final file 12 in place. The canal then may be irrigated, i.e., flushed and sterilized and then, if desired, a culture procedure may be instigated to determine the effectiveness of the sterilization. The procedure thus far described represents a standard root canal procedure.

Figure 2:
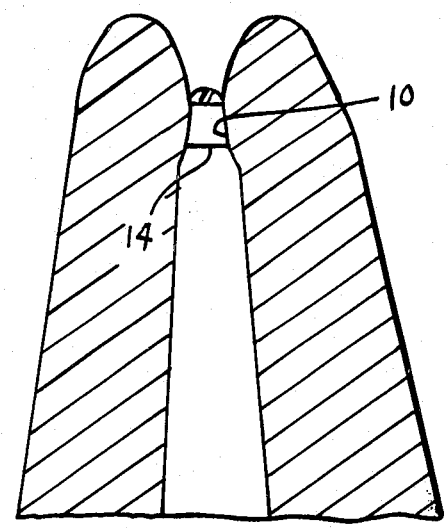
FIG. 2 is a view in cross section of the apex of the canal with the apical sealer screw of this invention in position.

The next step requires the sealing of the apex of the root canal and comprises the departure of my invention from current procedure. Since the tapered files or reamers used in the instrumentation step are usually graduated and numbered to correspond to their size, and since they are utilized by gradually increasing the size to enlarge the passageway until the canal is properly cleaned and shaped, the shape and size of the apical portion of the root canal is related to the last numbered file or reamer used in the instrumentation procedure. The sizes of the sealer element or screw, therefore, are related to the different file or reamer sizes and the one chosen for a particular endodontic procedure is in accordance with the size of the last used file or reamer. The sealer element or screw is to be placed in contact with the prepared canal wall. If the accuracy of the placement of the element is desired to be checked, the element is first dipped in chlora percha and positioned within the canal close to the apex thereof. After x-raying, the element is finally positioned and the tooth is ready for the filling of the canal. X-raying to determine the position may not be necessary in that many files or reamers have structure which enables the gaging of depth as a part of the tool. FIG. 2 illustrates an apical sealing element 14 in contact with the walls 10 of the root canal.

Figure 3:
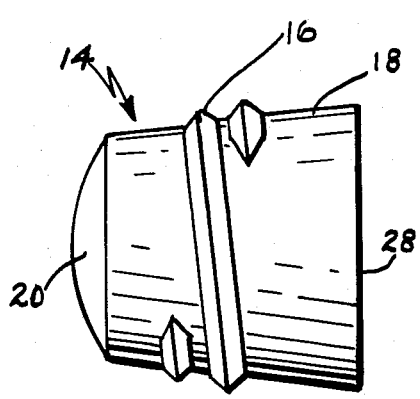
FIG. 3 is a frontal view of the apical sealer screw.

FIG. 3 illustrates one embodiment of sealing element 14 which utilizes a sharp screw thread 16 on the frusto-conical solid of revolution forming the tapered skirt portion 18 of the element. The top 20 of the sealing screw is domed as shown in FIG. 3 in order to minimize any possible irritation of periapical tissue which may come in contact with it. Since the body fluids would be in contact with the sealing screw element 14, it may be made of or plated with ticonium or other non-reactive material at portion 20 or also along the tapered skirt 18. It should be noted that the dimensions of the screw are directly related to the last used instrumenting file. The thread 16 along the tapered portion 18 is utilized to engage the wall structure of the root canal.

Figure 6:
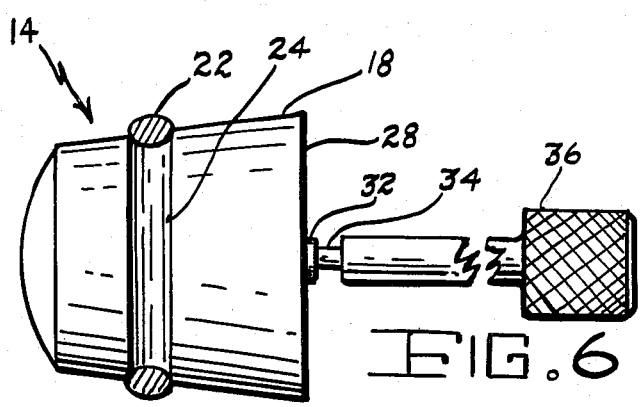
FIG. 6 is a frontal view of an alternative embodiment of an apical sealer element or plug with still another mode of positioning the element.

If a threaded engagement with the wall is not deemed desirable, the embodiment of the plug shown in FIG. 6 may be utilized. This Figure eliminates the thread 16 and substitutes therefor a gutta percha o-ring 22 in a groove 24 in the tapered body or skirt portion 18. Chemical softening, for example, with chloroform or heating to soften the gutta percha enables a sealing action between the canal wall 10 and the portion 18.

Figure 4:
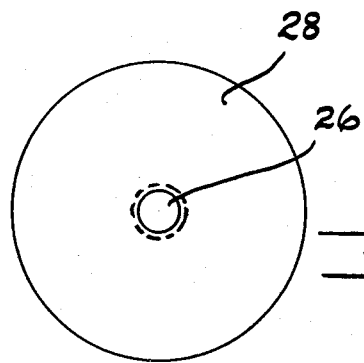
FIGS. 4 and 5 are end views of the screw of FIG. 3 and representing different modes for turning or securing the screw.
Figure 5:
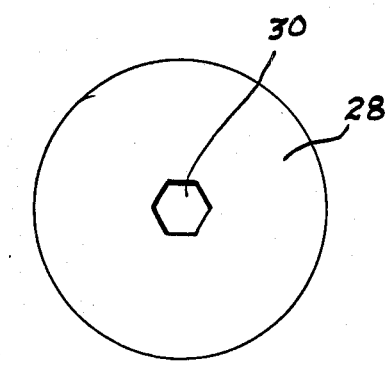

FIGS. 4 and 5 illustrate a pair of means for allowing placement of element 14 at its proper position. FIG. 4 illustrates an internally threaded hole 26 in the base 28 of element 14 while FIG. 5 illustrates a hexagonally shaped hole 30 for the same purpose.

Assuming that the apical sealer screw illustrated in FIG. 3 is to be applied and also assuming that the embodiment of FIG. 4 represents the base of the unit of FIG. 3, then, after the screw is positioned, it is required to be turned one-quarter turn clockwise to have the thread 16 of the screw 14 in engagement with the canal wall 10 for sealing the apex of the root canal. A file may be utilized for engagement with the hole 26 to place the screw 14 and provide for transmission of the force for turning the screw until it engages the canal wall 10. The hole 26 in this case would be tapered and would conform with a file size which is related to the size of the apical screw. A counterclockwise rotation applied to the file would disengage the file from the tapered, internal threads of the screw. Of course, a standard, non-tapered threaded hole at 26 would require only a mating threaded shaft for placing the screw. When the embodiment of FIG. 5 is applied to the screw 14 of FIG. 3, a conventional Allen wrench releasably cemented to the screw element would be utilized to place the screw and provide engagement of the screw threads 16 with canal wall 10 with a turning action. Release of the Allen wrench would be effected by simple withdrawal of the Allen wrench in a direction along the axis of the screw with sufficient force to break the cement bond.

FIG. 6 shows an element 32 permanently attached to or made a part of the base 28 of element 14 and provides the means for placement. This embodiment, however, has a notched shaft portion 34 which upon application of a predetermined force would break and allow the handle section 36 of the shaft to be removed. It should be understood that the embodiments of FIGS. 4 and 5 and portions 32 through 36 of FIG. 6 may be utilized with either of the element embodiments of FIGS. 3 and 6.

Once the screw or sealer element 14 is engaged with the wall 10 of the root canal at the last 2 or 3 millimeters of the canal, it enables the utilization of syringe filling for densely filling the canal and any lateral canals that may be found emanating from the main canal. The materials generally used for syringe filling are ZOE, pulp dent or liquid gutta percha. The elimination of voids and the filling of lateral canals assures a greater probability of success in endodontic treatment of the tooth. Once the canal is filled, the usual restoration techniques are applied to the tooth structure. The sealer elements of this invention also allow for the root canal work on very young teeth when the root is not completely developed and the canal opening is extremely large.

Although the invention has been described with reference to particular embodiments, it will be understood to those skilled in the art that the invention is capable of a variety of alternative embodiments within the spirit and scope of the appended claims.

I claim:

1. A method for endodontically treating a tooth comprising the steps of
    debridement of the nerve canal of said tooth,
    cleaning and shaping the nerve canal with instruments of gradually increasing size,
    placing a sealing element of the same general size and shape as the apex of said canal within said canal at the apex thereof, and
    syringe filling at least a portion of said canal adjacent said sealing element which does not allow material to be syringed beyond the apex of said canal.

2. A method as defined in claim 1 wherein said step of placing a sealing element involves a threaded engagement of said element with the wall of said canal.

3. An apical sealing element for sealing the apex of a tooth root canal which has been instrumented to a predetermined size and shape at said apex comprising
    a non-resilient frusto-conical solid of revolution of a size and shape corresponding to the dimensions of the apical end of said root canal to mate therewith,
    a domed portion at the smaller end of said frusto-conical solid of revolution,
    means on the outer periphery of said frusto-conical solid of revolution and projecting therefrom for sealing said solid of revolution to the apical end of a root canal, and
    means at the larger end of said solid of revolution for utilization in placement of said element.

4. A device as defined in claim 3 wherein said means for sealing comprises a thread around the tapered wall of said solid of revolution for engagement with the wall of said root canal.

5. A device as defined in claim 3 wherein said means for sealing comprises a gutta percha o-ring in a groove around the tapered wall of said solid of revolution.

6. A device as defined in claim 3 wherein said last-mentioned means comprises a threaded hole adapted for engagement with a mating shaft.

7. A device as defined in claim 3 wherein said last-mentioned means comprises a shaft emanating from said larger end, and a notch proximate to said larger end for breaking said shaft from said element upon application of a predetermined force.

8. A device as defined in claim 3 wherein said element has a material inert with respect to apical fluids and tissue at said domed portion.

9. A device as defined in claim 8 wherein the outer surface of said domed portion is of ticonium.

* * * * *